Patented July 12, 1927.

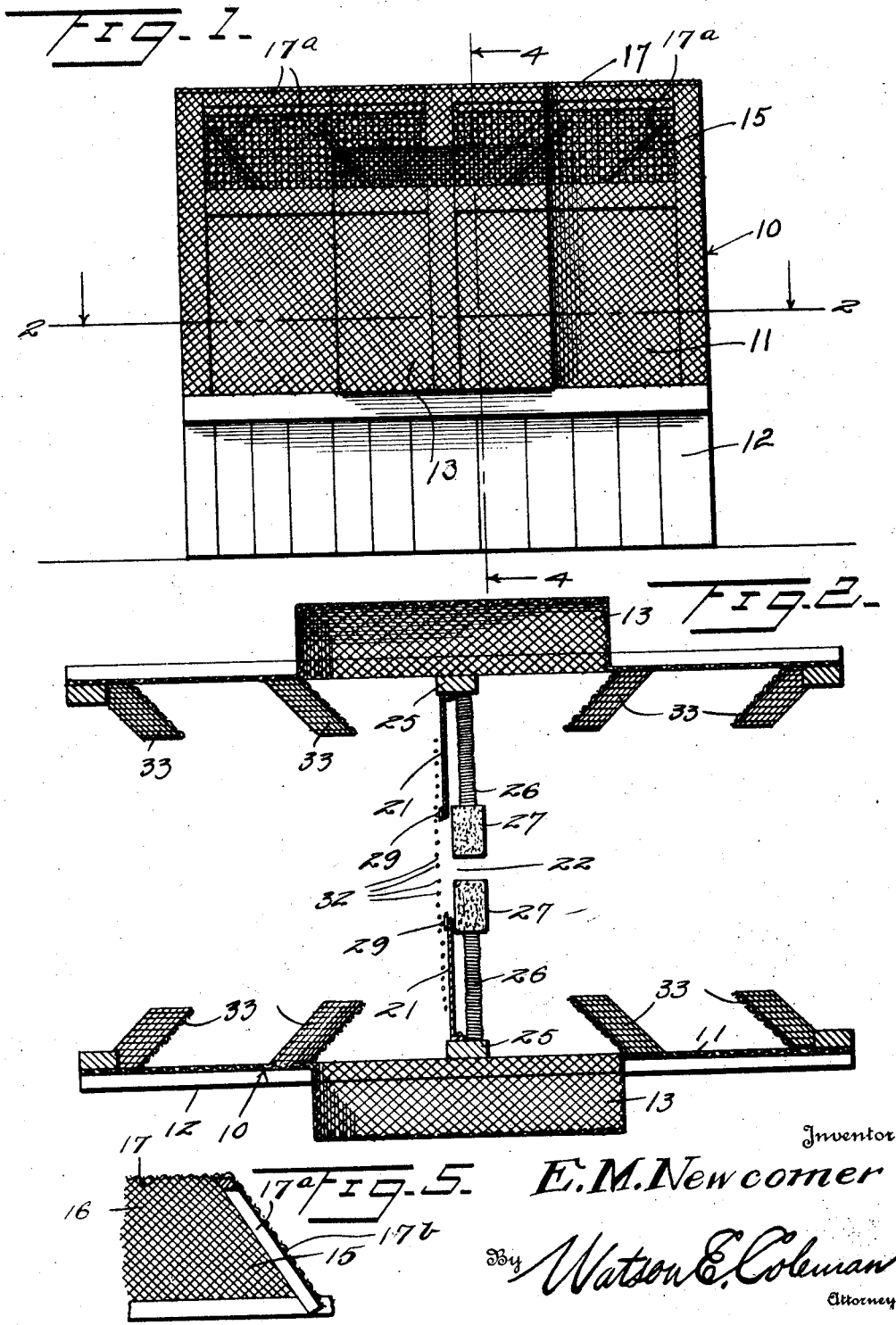

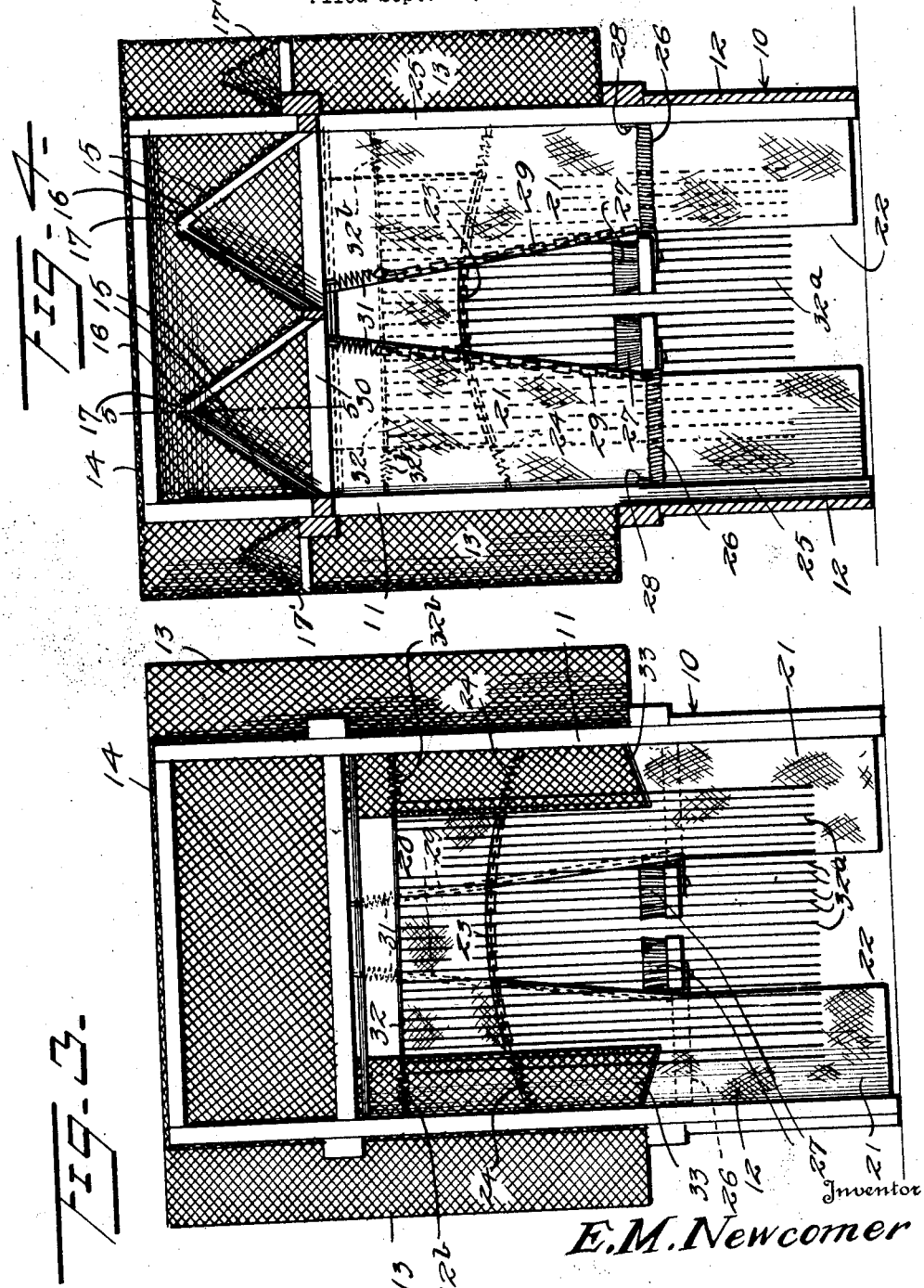

1,635,951

UNITED STATES PATENT OFFICE.

EDWARD M. NEWCOMER, OF NEWBURG, IOWA.

FLYTRAP.

Application filed September 14, 1926. Serial No. 135,397.

This invention relates to fly traps and more particularly to a device of that character wherein means are provided for engaging an animal passing through the trap to sweep the flies from the animal and cause the same to settle within the trap.

An important object of the invention is to provide a novel and improved means for settling the flies within the passage through which the animal passes to cause the flies to ascend to the upper end or ceiling of the passage wherein the traps are located.

A still further object of the invention is to provide a novel and improved means for removing the flies from the animal.

A still further object of the invention is to provide a device of this character which is particularly adapted for use in connection with dairy cattle and which may be so located that the animals must pass therethrough on their way to and from a barn.

These and other objects I attain by the construction shown in the accompanying drawings, wherein for the purpose of illustration is shown a preferred embodiment of my invention and wherein:—

Figure 1 is a side elevation of a fly trap constructed in accordance with my invention;

Figure 2 is a section on the line 2—2 of Figure 1;

Figure 3 is an end elevation of the fly trap;

Figure 4 is a section on the line 4—4 of Figure 1.

Figure 5 is a section on the line 5—5 of Figure 4.

Referring now more particularly to the drawings, the numeral 10 generally designates the side walls of a passage which, in accordance with my invention, are divided into upper and lower section 11 and 12, the lower section 12, the upper edge of which extends to the approximate level of the belly of the animal for which the passage is intended, is opaque, so that the lower portion of the passage is darker, while the upper portion is transparent and covered with screen wire throughout. This upper portion is centrally offset, as at 13, to provide bays, which enlarge the upper portion of the passage and which are likewise screen. The upper ends of the side walls and the bays are connected by a screen cover 14.

Arranged within the passage are a plurality of pairs of upwardly converging screen walls 15, the peaks 16 of which terminate short of the screen ceiling 14 and are formed with openings 17 permitting the passage of flies. In the upper end of each bay, a similar pair of converging strips 17' are employed, each of these pairs of strips acting to guide flies upwardly through the openings to the space between the converging pairs of screen walls and the roof which forms a trap chamber 18. Upwardly converging pairs of supports 17ª are provided for the converging screen walls 15, these strips being inclined so that their upper ends are more nearly adjacent the outer ends of the passage than their lower ends. To these strips are secured transversely extending screen partitions 17ᵇ which act as fly settlers directing flies moving between walls 15 and toward the outer end of the passage upwardly to the openings 17.

Located at the center of the passage is a sweep, which comprises upper curtains 20 and side curtains 21 combining to obscure view through the passage with the exception of a small centrally arranged vertical opening 22 through which the cattle may observe the light and so be caused to pass through the passage. To the lower edge of the upper curtains, a back currying chain or brush 23 is secured, the ends of this chain being connected by springs 24, posts 25 forming supports for the side walls 10 at the center of the passage. In approximate alignment with the upper edges of the lower sections 12 of these side walls, the brush holders 26 project outwardly from the side walls and are provided at their inner ends with belly brushes 27. The brush holders 26 are constructed in any suitable manner, so that they will maintain the brushes 27 yieldably at a central position, permitting these brushes to move to either side of the central position when engaged by the legs of the animal. In the present instance, the brush holders 26 are shown as comprising coil springs which are relatively stiff and have their outer ends secured to the posts 25, as at 28, and their adjacent ends secured to the brushes. Secured to the edges of the side curtains 21 are side currying chains or brushes 29, the lower ends of which are connected with the spring supports 26 and the upper ends of which are connected with a cross bar 30 connecting the posts 25 by springs 31. Extending transversely of the passage immediately adjacent the curtains and adjacent the top of the passage is a spring tensioned flexible support 32 from which extend flexible nets 32ª operating against the faces of the curtains and by the agitation imparted thereto during passage of an animal therethrough preventing flies from settling thereon. The flexible element 32 is preferably tensioned by springs 32ᵇ connected with the side walls of the passage.

Within the passage at opposite ends thereof, the side walls are provided with substantially vertically extending strips of screen material 33, these strips being secured at their outer edges to the side walls and having their inner edges diverging from the side walls toward the longitudinal center of the passage. While these strips are substantially vertically disposed, they are somewhat inclined, so that the upper ends thereof are arranged more nearly adjacent the center of the passage than the lower ends thereof. When an animal passes through the passageway and arrives at the sweep 19, portions of the sweep will engage practically every portion of the animal's anatomy to brush the flies therefrom. The back and side chains and belly brushes will, of course, have close contact with the sides and belly of the animal, while the flexible elements 32ª will be considerably agitated as the animal passes through the sweep and disturb any flies which might be located upon the legs of the animal. The disturbed flies will move from the bottom of the passage toward the upper end thereof because of the darkening of the passage and will not attempt to fly through the opposite end of the passage, due to the fact that the curtains 20 and 21 combine with the body of the animal to darken the passage at its center. Flying toward the nearest light, the flies will engage the side walls and in moving therealong will come into engagement with the vertically extending guard strips 33. Due to the fact that these guard strips converge toward the longitudinal center of the passage, the flies will ascend the side walls until they finally arrive at the roof and come between a pair of converging walls 15 or 16. Passing upwardly between these walls and through the opening 17, they will enter the trap chamber 18 where they will be securely held.

In the operation of the sweep, it is pointed out that the chain or brush 23 currying the back of the animal will be enabled to conform to the shaping of the back of the animal and to give vertically, due to the spring connection thereof with the posts 25. The spring connections of the chains or brushes 29 will likewise permit these elements to conform to the sides of the animal while the upward pull occasioned by spreading of these side brushes will cause the belly brushes 27 to very firmly engage against the belly of the animal.

A device of this character may be very readily and cheaply constructed and has been found durable and efficient in service, no difficulty having been encountered in teaching the animals to pass therethrough.

Since the construction hereinbefore set forth is capable of a certain range of change and modification without materially departing from the spirit of the invention, I do not limit myself to such specific structure except as hereinafter claimed.

I claim:—

1. In a fly trap for removing flies from animals, a passage having the lower portions of the side walls thereof opaque and the upper portions screened, a screen ceiling for the passage, means combining with the ceiling to provide a fly trap and directing upwardly moving flies thereinto, means at the center of the passage for engaging an animal passing therethrough to remove flies therefrom and means upon the side walls of the passage directing flies moving upwardly upon said side walls toward the center of the passage comprising screen strips secured to said side walls and projecting inwardly therefrom, said screens inclining from their lower to their upper ends toward the transverse center of the passage.

2. In a fly trap for removing flies from animals, a passage having the lower portions of the side walls thereof opaque and the upper portions screened, a screen ceiling for the passage, means combining with the ceiling to provide a fly trap and directing upwardly moving flies thereinto, means at the center of the passage for engaging an animal passing therethrough to remove flies therefrom and means upon the side walls of the passage directing flies moving upwardly upon said side walls toward the center of the passage comprising screen strips secured along one edge to the walls of the passage, said strips inclining toward the transverse center of the passage from their lower to their upper ends and from their attached to their free edges.

3. In a fly trap for removing flies from animals, a passage having the lower portions of the side walls thereof opaque and the upper portions screened, a screen ceiling for the passage, means combining with the ceiling to provide a fly trap and directing upwardly moving flies thereinto, means at the center of the passage for engaging an animal passing therethrough to remove flies therefrom, means upon the side walls of the passage directing flies moving upwardly upon said side walls toward the center of the passage, central portions of the screened upper portions of the side walls being enlarged to provide bays and means at the upper ends of said bays directing flies into said trap.

4. In a fly trap for removing flies from animals, a passage having the lower portions of the side walls thereof opaque and the upper portions screened, a screen ceiling for the passage, means combining with the ceiling to provide a fly trap and directing upwardly moving flies thereinto, means at the center of the passage for engaging an animal passing therethrough to remove flies therefrom, means upon the side walls of the passage directing flies moving upwardly upon said side walls toward the center of the passage, the means engaging the animal including curtains obscuring view through the passage with the exception of a centrally disposed opening which, during the passage of the animal, is obstructed by its body, means upon the edges of the curtain defining the opening for engaging the back and sides of the animal, means for engaging the belly of the animal yielding to permit passage of the legs thereof, the means engaging the sides of the animal being flexible and normally spaced from one another a distance less than the width of the body of the animal, a connection between the upper end of said means and the wall of the passage and a connection between the lower end thereof and the belly engaging means whereby the belly engaging means is urged upwardly during passage of the animal.

5. In a fly trap for removing flies from animals, a passage for the animal, a screen ceiling for the passage, means combining with the ceiling to provide a fly trap including upwardly converging walls having openings at the apices thereof, and means extending transversely of the space between said walls for directing flies moving toward the outer ends of the passage and between said walls upwardly toward said openings.

6. In a fly trap for removing flies from animals, a passage for the animal, a screen ceiling for the passage, means combining with the ceiling to provide a fly trap including upwardly converging walls having openings at the apices thereof, and means extending transversely of the space between said walls for directing flies moving toward the outer ends of the passage and between said walls upwardly toward said openings comprising screen partitions connecting said walls and inclining from their lower to their upper ends away from the center of the passage.

7. In a fly trap for removing flies from animals, a passage having a screen ceiling means combining with the ceiling to provide a fly trap, means for directing flies upwardly into the trap and means at the center of the passage engaging an animal passing therethrough to remove flies therefrom including elements for engaging the sides of the animal and other elements for engaging the belly of the animal, said elements for engaging the sides of the animal being flexible and normally spaced from one another a distance less than the width of the body of the animal, the upper ends of said side engaging elements being connected with the wall of the passage and a connection between the lower ends thereof and the belly engaging means whereby the belly engaging means is urged upwardly during the passage of the animal.

In testimony whereof I hereunto affix my signature.

EDWARD M. NEWCOMER.